United States Patent
Hayakawa

(10) Patent No.: US 10,977,302 B2
(45) Date of Patent: Apr. 13, 2021

(54) INFORMATION PROCESSING METHOD, INFORMATION PROCESSING APPARATUS, AND STORAGE MEDIUM STORING PROGRAM, WITH OUTPUTTING ALBUM DATA CORRESPONDING TO ALBUM IN WHICH IMAGES ARE LAID

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 14 days.

(21) Appl. No.: 16/444,484

(22) Filed: Jun. 18, 2019

(65) Prior Publication Data

US 2020/0004774 A1 Jan. 2, 2020

(30) Foreign Application Priority Data

Jun. 29, 2018 (JP) ................. 2018-125288

(51) Int. Cl.
*G06F 16/50* (2019.01)
*G06F 16/55* (2019.01)
(Continued)

(52) U.S. Cl.
CPC .............. *G06F 16/55* (2019.01); *G06F 16/50* (2019.01); *G06F 16/535* (2019.01); *G06F 16/538* (2019.01); *G06F 16/58* (2019.01); *G06F 16/583* (2019.01); *G06F 16/587* (2019.01); *G06F 16/5838* (2019.01); *G06F 16/5846* (2019.01);
(Continued)

(58) Field of Classification Search
CPC ........ G06F 16/50; G06F 16/55; G06F 16/538; G06F 16/535; G06F 16/58; G06F 16/583; G06F 16/51; G06F 3/04842; G06F 3/0482; G06F 16/5838; G06F 16/5846; G06F 16/5854; G06F 16/5862; G06F 16/587
See application file for complete search history.

(56) References Cited

U.S. PATENT DOCUMENTS 7,940,284 B2 * 5/2011 Hitaka ................. G06F 40/166
345/619
8,493,610 B2 7/2013 Kitagawa et al.
(Continued)

FOREIGN PATENT DOCUMENTS

JP 2000-082128 A 3/2000
JP 2016-164748 A 9/2016

*Primary Examiner* — Dino Kujundzic
(74) *Attorney, Agent, or Firm* — Venable LLP

(57) ABSTRACT

There is provided with an information processing method for outputting album data corresponding to an album in which images are laid out. The method comprises obtaining information corresponding to each of a plurality of images, selecting a plurality of analysis target images from the plurality of images, executing a predetermined analysis on the plurality of selected analysis target images, and outputting album data. In case where images satisfying the predetermined criterion is less than the predetermined number, the predetermined analysis is executed on a predetermined image not selected by the predetermined selection condition. In the outputting, album data corresponding to an album in which the predetermined number or greater of images including the predetermined image are laid out is output.

18 Claims, 6 Drawing Sheets

(51) Int. Cl.
  *G06F 16/538* (2019.01)
  *G06F 16/58* (2019.01)
  *G06F 16/535* (2019.01)
  *G06F 16/583* (2019.01)
  *G06F 16/587* (2019.01)

(52) U.S. Cl.
  CPC ...... *G06F 16/5854* (2019.01); *G06F 16/5862* (2019.01)

(56) References Cited

U.S. PATENT DOCUMENTS

| | | |
|---|---|---|
| 10,366,520 B2 | 7/2019 | Hayakawa |
| 2002/0122067 A1* | 9/2002 | Geigel .................... G06T 11/60 715/788 |
| 2006/0050300 A1* | 3/2006 | Mitani ............... G06Q 30/0603 358/1.15 |
| 2006/0221779 A1* | 10/2006 | Matsushita ........ H04N 1/00132 369/30.01 |
| 2010/0115399 A1* | 5/2010 | Kohar ................. H04N 1/2179 715/243 |
| 2011/0129159 A1* | 6/2011 | Cifarelli ................. G06F 16/51 382/224 |
| 2014/0101152 A1* | 4/2014 | Chen ....................... G06F 16/50 707/736 |
| 2016/0259604 A1 | 9/2016 | Hayakawa |
| 2018/0218526 A1 | 8/2018 | Hayakawa |
| 2019/0104221 A1 | 4/2019 | Hayakawa |

* cited by examiner

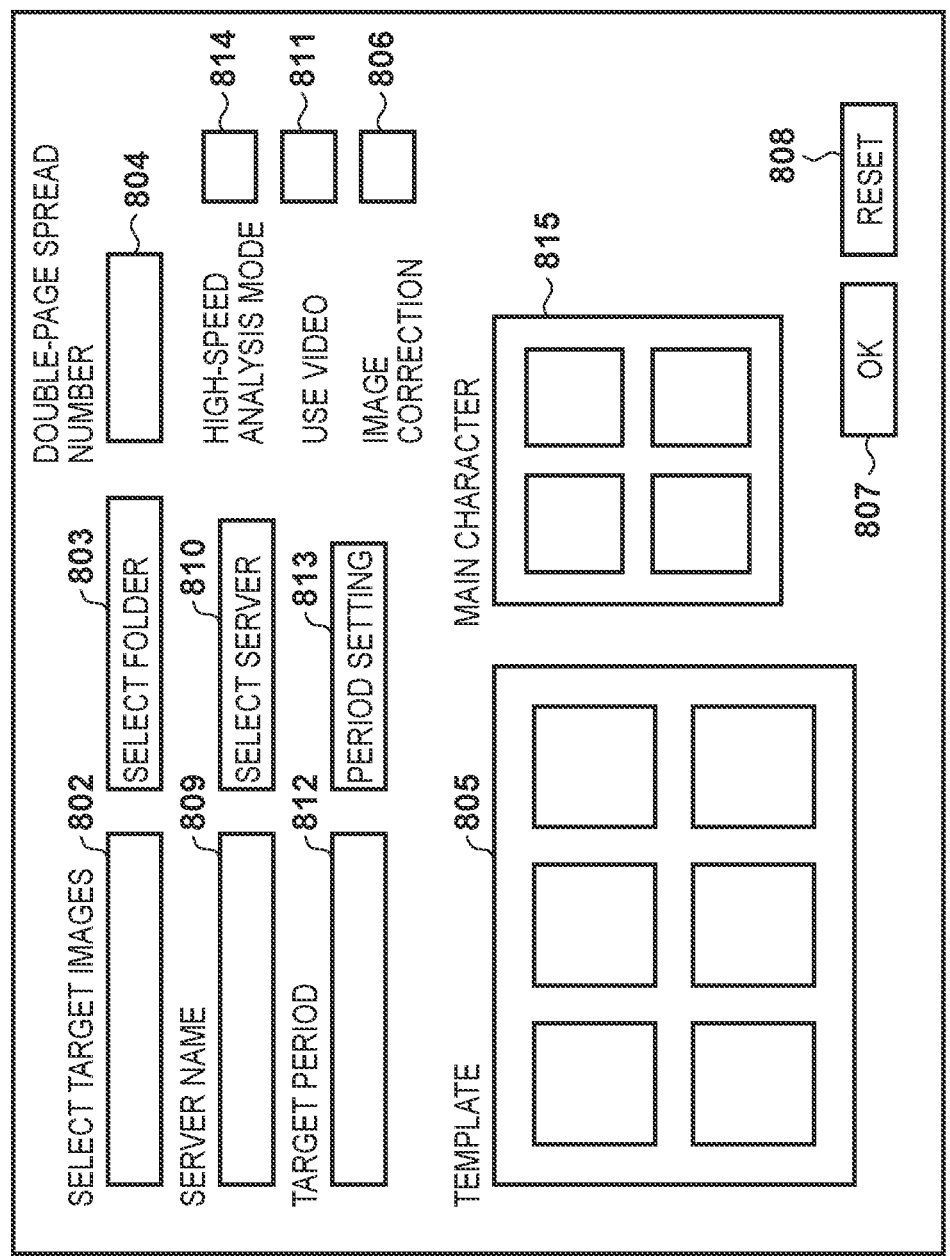

INFORMATION PROCESSING METHOD, INFORMATION PROCESSING APPARATUS, AND STORAGE MEDIUM STORING PROGRAM, WITH OUTPUTTING ALBUM DATA CORRESPONDING TO ALBUM IN WHICH IMAGES ARE LAID

BACKGROUND OF THE INVENTION

Field of the Invention

The present invention relates to an information processing method, an information processing apparatus, and a storage medium storing a program by which it is possible to execute an image data layout.

Description of the Related Art

In Japanese Patent Laid-Open No. 2000-082128, it is described that digital photographs are read from a card connected to an image input apparatus, and are automatically arranged in an album. Also, in Japanese Patent Laid-Open No. 2016-164748, it is described that even if images of a number exceeding an upper limit for analysis are included in a folder that a user selected, images are selected based on image metadata, the selected images are analyzed, and scoring is performed. On top of that, it is described that laying out is performed in order from highest to lowest score, and automatic album creation processing is thereby executed.

SUMMARY OF THE INVENTION

According to an embodiment of the present invention, there is provided an information processing method for outputting album data corresponding to an album in which images are laid out, the method comprising: obtaining information corresponding to each of a plurality of images; based on the obtained information, selecting, from the plurality of images, a plurality of analysis target images; executing a predetermined analysis on the plurality of selected analysis target images; and in a case where, a number of images that are selected in the selection and that satisfy a predetermined criterion as a result of the executed predetermined analysis is a predetermined number or greater of images, outputting album data corresponding to an album in which images included in the predetermined number or greater of images are laid out, wherein in a case where images satisfying the predetermined criterion among the plurality of analysis target images are selected in the selection in accordance with a predetermined selection condition and the number of the selected images is less than the predetermined number, the predetermined analysis is executed on a predetermined image not selected by the predetermined selection condition, and album data corresponding to an album in which the predetermined number or greater of images including the predetermined image are laid out is output based on the result of the predetermined analysis in the outputting.

According to another embodiment of the present invention, there is provided an information processing apparatus operable to output album data corresponding to an album in which images are laid out, the apparatus comprising: an obtaining unit configured to obtain information corresponding to each of a plurality of images; a selection unit configured to, based on the information obtained by the obtaining unit, select, from the plurality of images, a plurality of analysis target images; an analysis unit configured to execute a predetermined analysis on the plurality of analysis target images selected by the selection unit; and an output unit configured to, in a case where, a number of images that are selected by the selection unit and that satisfy a predetermined criterion as a result of the predetermined analysis executed by the analysis unit is a predetermined number or greater, output an album in which images included in the predetermined number or greater of images are laid out, wherein in a case where images satisfying the predetermined criterion among the plurality of analysis target images are selected by the selection unit in accordance with a predetermined selection condition and the number of the selected images is less than the predetermined number, the predetermined analysis is executed by the analysis unit on a predetermined image not selected by the predetermined selection condition, and album data corresponding to an album in which the predetermined number or greater of images including the predetermined image are laid out based on the result of the predetermined analysis by the output unit.

According to still another embodiment of the present invention, there is provided a non-transitory computer-readable storage medium storing a program which, when executed by a computer comprising a processor and a memory, causes the computer to: obtain information corresponding to each of a plurality of images; based on the obtained information, selecting, from the plurality of images, a plurality of analysis target images; execute a predetermined analysis on the plurality of selected analysis target images; and in a case where, a number of images that are selected in the selection and that satisfy a predetermined criterion as a result of the executed predetermined analysis is a predetermined number or greater of images, output album data corresponding to an album in which images included in the predetermined number or greater of images are laid out, wherein in case where images satisfying the predetermined criterion among the plurality of analysis target images are selected in the selection in accordance with a predetermined selection condition and the number of the selected images is less than the predetermined number, the predetermined analysis is executed on a predetermined image not selected by the predetermined selection condition, and album data corresponding to an album in which the predetermined number or greater of images including the predetermined image are laid out is output based on the result of the predetermined analysis in the outputting.

Further features of the present invention will become apparent from the following description of exemplary embodiments (with reference to the attached drawings).

BRIEF DESCRIPTION OF THE DRAWINGS

FIG. 8A is a flowchart illustrating overall processing according to the album generation processing.

FIG. 8B is a view illustrating one example of a UI screen for a user to input settings of an automatic layout function.

DESCRIPTION OF THE EMBODIMENTS

Figure 1:
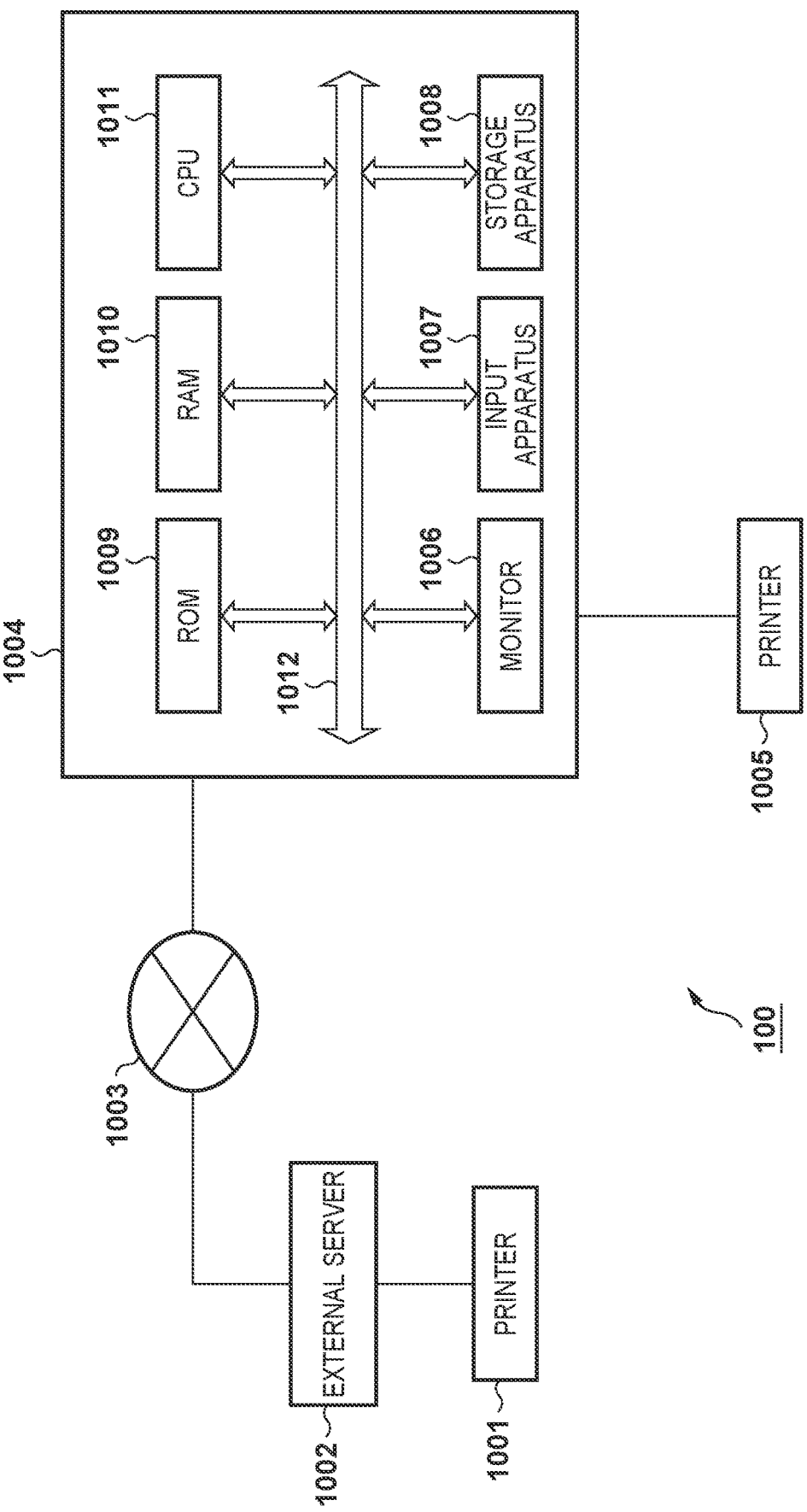
FIG. 1 is a view illustrating a system configuration.

According to the description of Japanese Patent Laid-Open No. 2016-164748, because analysis is performed after selecting images based on image metadata or the like, it is possible to reduce the number of images that are the target for analysis, and a faster automatic layout of images becomes possible. However, in such a case, there are cases in which as the result of analysis it is found that a file is corrupted or an image that is unsuitable for a layout or the like is included. Accordingly, there are cases where the number of images that are appropriate as layout targets does not meet the number of images needed in the layout.

Embodiments of the present invention solve such conventional problems. In consideration of the foregoing points, the present invention provides an information processing method, an information processing apparatus, and a storage medium storing a program for reducing the possibility that a predetermined number of images that satisfy predetermined criteria are not selected.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the problem solving means according to the present invention. Note that the same reference numerals denote the same components and a description thereof will be omitted.

Configuration of Information Processing System (FIG. 1)

FIG. 1 is a block diagram illustrating an overview configuration of an information processing system 100 (hereinafter, the system) in the present embodiment. In a system 100, printing and binding are performed based on album data generated on an information processing apparatus 1004, and it is possible to generate an album such as a photo album or a photo book thereby. The information processing apparatus 1004 is an information processing apparatus that can generate album data, and, for example, the information processing apparatus 1004 is a PC that a user owns. The information processing apparatus 1004 activates an album creation application upon a user operation. The album creation application has an automatic layout function in which, based on inputted image data, a layout is performed in relation to a user-desired template, and album data is generated. The automatic layout function is a function that lays out, in a template that is prepared in advance, captured image data for example, based on content or attributes thereof, and displays a result on a display. The information processing apparatus 1004 outputs generated album data to a printer as print data, and can upload the data to an external server 1002 via a network 1003. The external server 1002 is an album order reception/management server, for example, and in accordance with order data transmitted by a user instruction from the information processing apparatus 1004 or a mobile terminal (not shown) that a user owns or the like, performs order reception processing or printing/binding processing using a printer 1001. A bound album is delivered to a user. Also, in the system 100, there are cases in which printing/binding is performed by a printer 1005 based on album data generated by the information processing apparatus 1004 without using the external server 1002 and the printer 1001.

The network 1003 is connected to the information processing apparatus 1004 and the external server 1002, and is a communication network for transmitting information from each of the connected apparatuses. The network 1003 is, for example, the Internet, and the information processing apparatus 1004 and the external server 1002 are connected to each other via an input/output interface configured to correspond to a wired or wireless network medium, or the like. Also, the external server 1002 has an input/output interface (not shown) for connection with the printer 1001.

The information processing apparatus 1004 includes a ROM 1009, a RAM 1010, a CPU 1011, a monitor 1006, an inputting apparatus 1007, and a storage apparatus 1008. Also, the information processing apparatus 1004 has an input/output interface (not shown) for connecting to the printer 1005 and the network 1003.

The CPU 1011 is a central processing unit, and controls the entire information processing apparatus 1004 by executing an operating system program (hereinafter, abbreviated as "OS") stored in the storage apparatus 1008, the ROM 1009, or the RAM 1010. The CPU 1011 is communicatively coupled to the ROM 1009, the RAM 1010, the monitor 1006, the inputting apparatus 1007, and the storage apparatus 1008 via a data bus 1012. In addition, the CPU 1011 executes programs stored in the ROM 1009 and the RAM 1010, thereby realizing each functional configuration of the information processing apparatus 1004, calculating and processing information, and controlling and executing each piece of hardware. The ROM 1009 is a read-only memory in which programs are stored. The RAM 1010 is a random access memory, and is used, for example, as a work memory of the CPU 1011. In some cases, the RAM 1010 is composed of a non-volatile memory and stores programs.

The monitor 1006 is a display unit that displays various user interface (UI) screens, and presents, for example, a setting screen of an album creation application and a layout result of an image to the user. The inputting apparatus 1007 includes, for example, a keyboard and a pointing device, and can accept settings and instruction operations from a user. The inputting apparatus 1007 receives, for example, an input of a folder or the like as an image data acquisition destination from a user on a UI screen displayed on the monitor 1006. The inputting apparatus 1007 may be integrated with the monitor 1006. In this case, for example, a touch panel may be provided on the display screen of the monitor 1006, and configuration may be such that input from the user can be accepted when the user directly touches the monitor 1006. The storage apparatus 1008 is a storage apparatus such as a hard disk drive (HDD) or a solid state drive (SSD) for storing image data, templates, and the like.

In the present embodiment, the information processing apparatus 1004 includes the monitor 1006, the inputting apparatus 1007, and the storage apparatus 1008, but other apparatus configurations may be used. For example, a main body including the CPU 1011, the ROM 1009, and the RAM 1010; the monitor 1006; the inputting apparatus 1007; and the storage apparatus 1008 may be independently configured.

Next, an automatic album creation process executed by the information processing apparatus 1004 will be described. In the present embodiment, a procedure of starting an album creation application and performing automatic layout on the information processing apparatus 1004 will be described. In the present embodiment, "image" is assumed to encompass still images and frame images in a moving image unless otherwise specified.

FIG. 8A is a flowchart showing processing up to creation of album data in the information processing apparatus 1004. The processes of FIG. 8A are realized by, for example, the CPU 1011 loading a program stored in the ROM 1009 into the RAM 1010 and executing the program.

In step S8001, the CPU 1011 activates the album creation application by accepting a click operation on an icon on a screen or the like. In step S8002, the CPU 1011 displays a UI screen of the album creation application, and accepts settings of the automatic layout function. FIG. 8B is a diagram illustrating an example of a UI screen 801 for a user to input settings of the automatic layout function.

The UI screen 801 is displayed on the monitor 1006. A path box 802 on the UI screen 801 indicates a storage location (path) from which the image data group that is to be the target of the automatic layout function of the album creation application is to be obtained. A folder selection button 803 is pressed by the user to display a folder including an image data group that is to be the target of the automatic layout function of the album creation application so as to be selectable by the user in a tree configuration. Then, a folder path including the image data group selected by the user is displayed in the path box 802.

A double-page spread number box 804 accepts the setting of double-page spread count of the album from the user. A template designation icon 805 displays an illustration image for each taste (pop tone, chic tone, or the like) for album templates. A plurality of template icons are displayed to be lined up in the template designation icon 805, and can be selected by the user. An image correction checkbox 806 accepts the setting of the image correction ON/OFF from the user. The image correction is, for example, red-eye correction or contrast correction. The state in which the image correction checkbox 806 is checked is a state in which image correction ON is designated, and the state in which the image correction checkbox 806 is not checked is a state in which the image correction OFF is designated. Note that in the UI screen 801, ON/OFF may be set for each individual image correction process. When the user presses an OK button 807, the CPU 1011 obtains the content set on the UI screen 801. A reset button 808 is a button for resetting respective setting information on the UI screen 801.

A server name box 809 indicates the name of the server from which the image data group of the album creation target is to be obtained. In addition, a server selection button 810 displays a server name to be an obtainment destination for an image data group to be the target of album creation in a list configuration so as to be selectable by a user. The server name selected by the user is displayed in the server name box 809. When the OK button 807 is pressed in a state where the server name is displayed in the server name box 809, a screen for logging into the designated server is displayed. When the login to the server designated by the user operation via the displayed login screen is completed, the CPU 1011 can obtain the image data from the designated server.

A moving image usage checkbox 811 accepts from the user a setting as to whether or not a folder designated in the path box 802 or a moving image in the server designated in the server name box 809 is to be the target of album creation. A state in which the moving image usage checkbox 811 is checked is a state in which moving images are made to be a target of album creation, and a state in which it is not checked is a state in which moving images are designated not to be the target of album creation.

A target period box 812 accepts the setting of shooting date/time period of the image data to be the target of the album creation application from the user. Also, the target period box 812 displays the designated shooting date/time period. A period setting button 813 displays a period that is to be the target of album creation in a user-selectable manner. When the user selects a target period by the period setting button, the period is input into the target period box. When the OK button 807 is pressed in a condition in which the shooting date/time period is displayed in the target period box 812, an image data group corresponding to the designated shooting date/time period is obtained as an album creation target.

An analysis mode selection box 814 accepts a selection of whether or not to execute a high-speed analysis mode in the analysis of the image data. The high-speed analysis mode will be described later. In a main character designation icon 815, an icon (a facial image of a person) for the user to designate a main character is displayed so as to be selectable. A facial image to be displayed is registered in advance in a face database in association with an individual ID, and the user can specify a selected facial image as the main person in the album data to be created. For example, image data including, at a large size, the facial image selected as a main character has a higher evaluation value (score, rank) and becomes more likely to be selected as a layout execution target.

FIG. 8A is referred to once again. In step S8003, the CPU 1011 lays out the image data on a template based on the setting information set in step S8002. The CPU 1011 obtains the image data group from the acquisition destinations set in the path boxes 802 and 809. In this case, when the number of images of the obtained image data group is larger than a predetermined number, the CPU 1011 selects image data to be the target of analysis. Details of the obtainment and selection of the image data group will be described later. Further, the CPU 1011 analyzes/scores image data of a predetermined number or less of selected image data, and then makes a subset of that image data the target of the layout in the template in descending order of score. Then, the CPU 1011 lays out the image data that is the target of the layout in the template to create album data.

In step S8004, the CPU 1011 outputs the album data in which image data is laid out in the template. For outputting the album data, for example, the CPU 1011 uploads the album data to the external server 1002 via the network 1003 in accordance with an instruction from the user. The uploaded album data is printed out and bound by the printer 1001 connected to the external server 1002 when the user performs a purchase procedure via the mobile terminal. Also, a bound album is delivered to a user. Note that when the user prints and binds the document by himself/herself without going through the external server 1002, the document is printed and bound by the printer 1005 connected to the information processing apparatus 1004.

Figure 2:
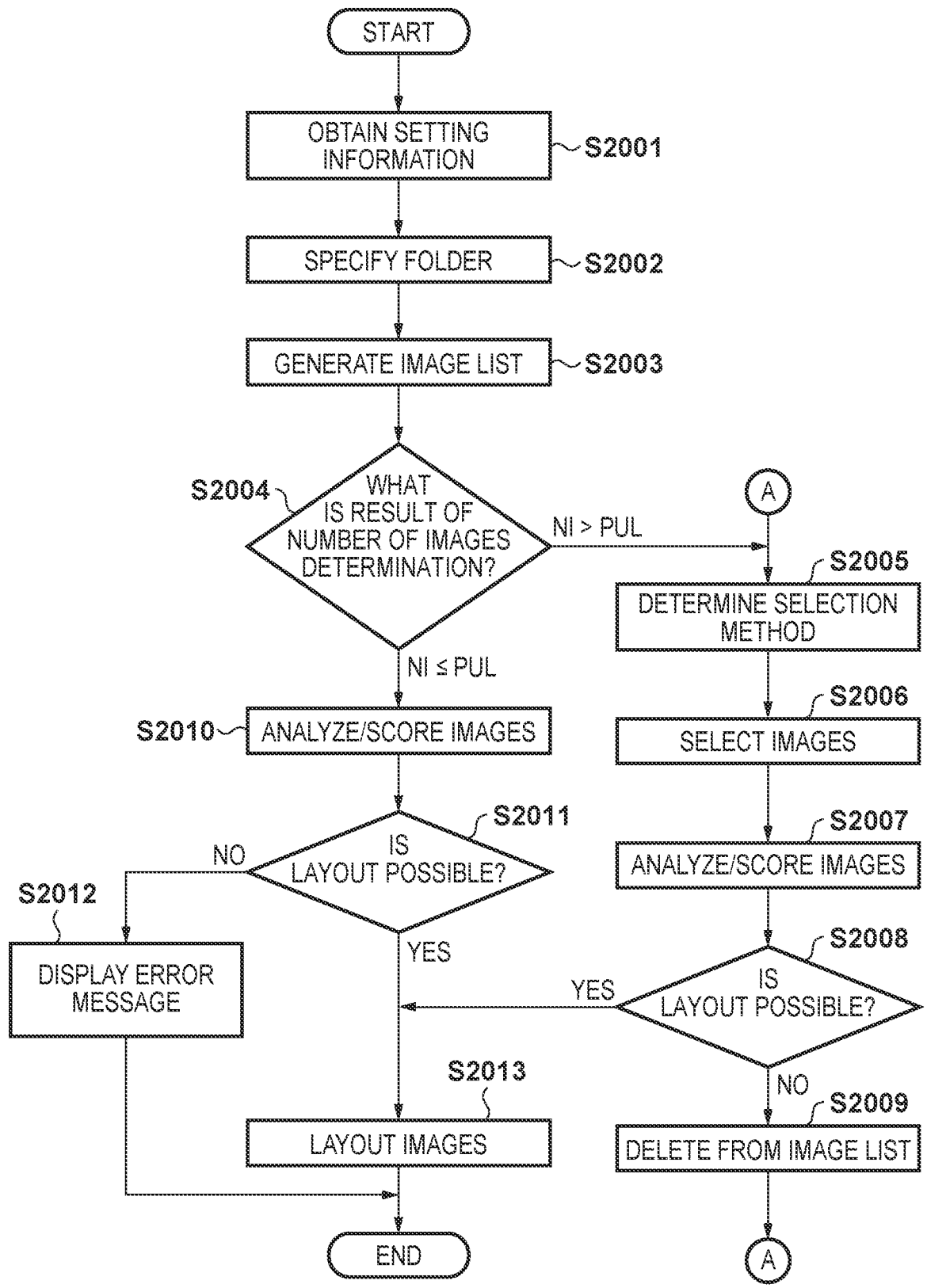
FIG. 2 is a flowchart illustrating album generation processing.

FIG. 2 is a flowchart showing album creation processing executed by the information processing apparatus 1004. The flowchart of FIG. 2 shows details of step S8003 of FIG. 8A.

In step S2001, the CPU 1011 obtains the setting information set in step S8002. For example, the CPU 1011 obtains an album template and the number of pages of the template as setting information. In step S2002, the CPU 1011 specifies a destination from which to obtain the image data to be the target of the automatic layout function of the album creation application. For example, the CPU 1011 specifies a folder designated in the path box 802 of the UI screen 801 as the destination from which to obtain the data. Hereinafter, the destination from which to obtain the data will be described as a folder. Here, an OS operating on the information processing apparatus 1004 may prepare an image management folder, and the user may also use the image management folder prepared by the OS. In such cases, the CPU 1011 may specify the image management folder prepared by the OS as the obtainment destination as a default folder in step S2002. Also, instead of a folder, an image data group on a designated server may be specified.

In step S2003, the CPU 1011 generates an image list of image data included in the specified folder based on the image data information included in the folder. Generally, the OS has a file management function, and it is possible to enumerate files for each folder. The enumerated file names are added to the image list by filtering the enumerated files based on extensions (such as JPG) added to the images. In addition, since a folder may be included in a folder, an image list of all the image data included under the folder specified in step S2002 is obtained by recursively calling the enumeration function or the like. The CPU 1011 causes the OS to execute the above process, thereby obtaining the number of images added to the image list from the OS. Further, the CPU 1011 allocates an array corresponding to the obtained number of images in a storage area such as the RAM 1010.

In step S2004, the CPU 1011 determines whether or not the number of images (NI) obtained in step S2003 exceeds a predetermined upper limit for analysis (PUL). When it is determined that the upper limit for analysis is exceeded (NI>PUL), the process proceeds to step S2005, and when it is determined that the number of images is equal to or less than the upper limit for analysis (NI≤PUL), the process proceeds to step S2010. Note that in the present embodiment, for the sake of explanation, there are cases in which the term "image" is used in correspondence with image information such as metadata, and the term "number of images" is used in correspondence with the number of pieces of image information.

Here, the upper limit for analysis is an upper limit on the number of images that can be subjected to the image analysis/scoring process in step S2010 or step S2007. The upper limit for analysis is determined mainly based on a memory upper limit of the information processing apparatus. However, as performance of information processing apparatuses has improved in recent years, memory capacity has increased, and if calculation is simply performed based on the memory upper limit only, the upper limit for analysis will become extremely large, and the analysis/scoring process will take a long time. Therefore, the upper limit for analysis may be designated by the user. For example, it may be possible to select an upper limit for analysis (normal analysis mode) mainly determined based on the memory upper limit of the information processing apparatus, and an upper limit for analysis (high-speed analysis mode) determined based on a time period designated by the user during which analysis can be awaited. With such a configuration, for example, the user selects the normal mode so that as many images as possible can be analyzed for a purpose such as creating a photo album from photographs taken and stored over a lifetime. In addition, for a purpose such as regularly collecting photographs taken daily in an album, the user selects the high-speed mode so that the processing is completed as soon as possible. In this manner, the user can select the upper limit for analysis based on the content of the album and the time to wait for the analysis. The upper limit for analysis of the normal analysis mode is, for example, 5000 images, and the upper limit for analysis of the high-speed analysis mode is, for example, 100 images.

The user's selection of the upper limit for analysis can be accepted by the analysis mode selection box 814 on the UI screen 801 of FIG. 8B. When the number of images obtained in step S2003 exceeds the upper limit for analysis of the high-speed analysis mode in the determination of step S2004, a message for confirming whether to use the high-speed analysis mode may be displayed to the user. In such a case, when an instruction to use the high-speed analysis mode is received, the CPU 1011 sets the upper limit for analysis of the high-speed analysis mode as the upper limit for analysis.

Hereinafter, a case where it is determined in step S2004 that the number of images (NI) obtained in step S2003 exceeds the predetermined upper limit for analysis (PUL) will be described.

In step S2005, the CPU 1011 determines a selection method using information of image data, for example, file information or image metadata, so that the number of images obtained in step S2003 is equal to or less than the upper limit for analysis. The CPU 1011 may use a plurality of selection methods, as described below, and step S2005 determines which selection method to use. In the determination of the selection method in step S2005, when the step S2005 process is executed for the first time, any one of the selection methods described later may be set by default. The case of the second and subsequent execution will be described later. Next, in step S2006, the CPU 1011 selects the image data by the selection method determined in step S2005.

Hereinafter, selection methods according to the present embodiment will be described.

Figure 3:
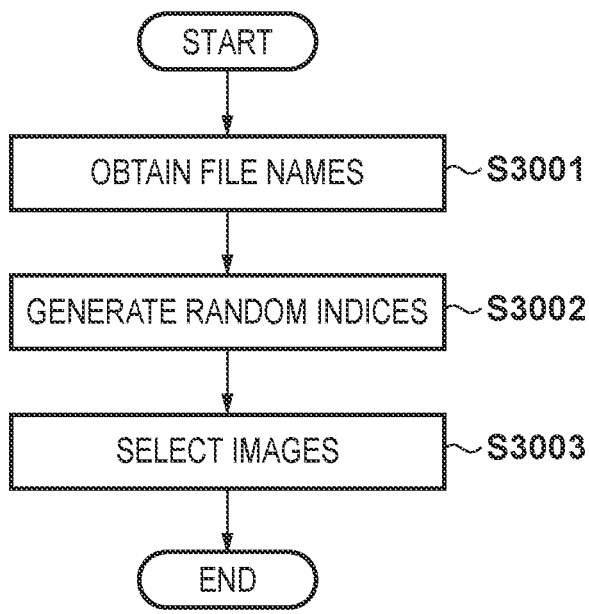
FIG. 3 is a flowchart illustrating selection processing according to a selection method 1.

Selection Method 1 (FIG. 3)

FIG. 3 is a flowchart showing processing of the selection method 1. In the selection method 1, images are randomly selected using file information. Hereinafter, the processes of FIGS. 3 to 7 (selection method 1 to selection method 5) are realized, for example, by the CPU 1011 loading a program stored in the ROM 1009 into the RAM 1010 and executing the program.

In step S3001, the CPU 1011 obtains file names (image information) from file information, and sets the file names in an array (image array) allocated in a storage area of the RAM 1010. Next, in step S3002, (the number of images (NI)–the upper limit for analysis (PUL)–1) random array indices are generated. In step S3003, the CPU 1011 performs selection by deleting image data corresponding to the array indices generated in step S3002 from the image array. After step S3003, the process of FIG. 3 ends.

Through the processing of FIG. 3, the size of the array in which the image information is stored is selected so as to be equal to or less than the upper limit for analysis. Note that the order in which the file information is obtained may depend on the OS operating in the information processing device, and when combined with the random array indices generated in step S3002, there is a possibility that an unintentional bias will occur in the selection. In such a case, an unintended bias may be prevented by obtaining an image shooting date from image information such as file information, file creation date/update date, image metadata, or the like, and sorting according to date/time after step S3001.

Figure 4:
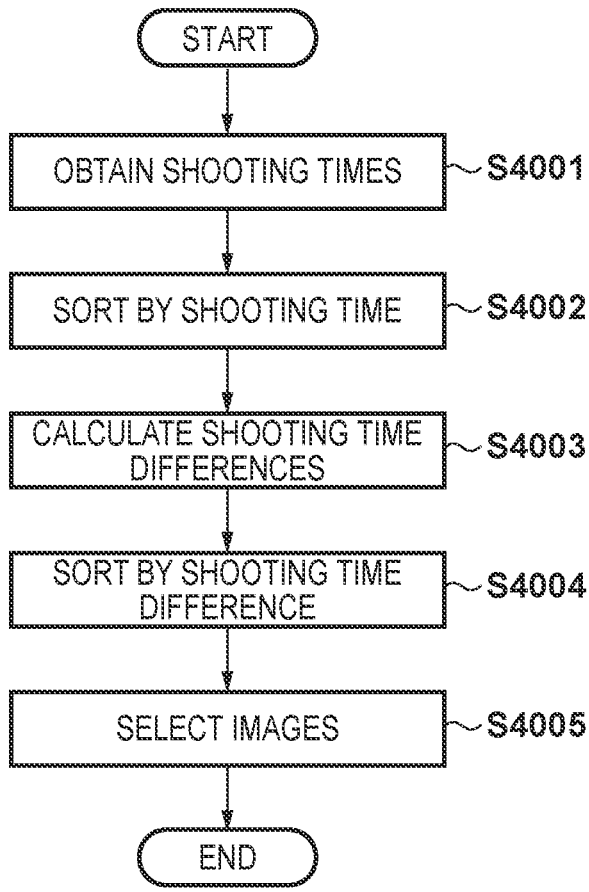
FIG. 4 is a flowchart illustrating selection processing according to a selection method 2.

Selection Method 2 (FIG. 4)

FIG. 4 is a flowchart showing the processing of the selection method 2. In the selection method 2, images between which a shooting interval is long are selected by using image metadata. The selection method 2 is used, for example, when similar photographs are taken over a short time by a continuous shooting function of a camera or the like, so that similar images can be excluded before analysis to create an album.

In step S4001, the CPU 1011 obtains shooting times as the image metadata, and sets the shooting times in the image array allocated in the storage area of the RAM 1010. In step S4002, the CPU 1011 sorts the image array in ascending order using shooting time as a key. In step S4003, the CPU 1011 calculates the shooting time differences between adjacent elements in the image array in the sorted order.

In step S4004, the CPU 1011 sorts the image array in ascending order using shooting time difference as a key. In step S4005, the CPU 1011 makes the selection by deleting, from the image array, image information corresponding to (the number of images (NI)−the upper limit for analysis (PUL)−1) elements from the head of the image array sorted by the shooting time difference in step S4004 (in ascending shooting time difference order). After step S4005, the process of FIG. 4 ends.

Figure 5:
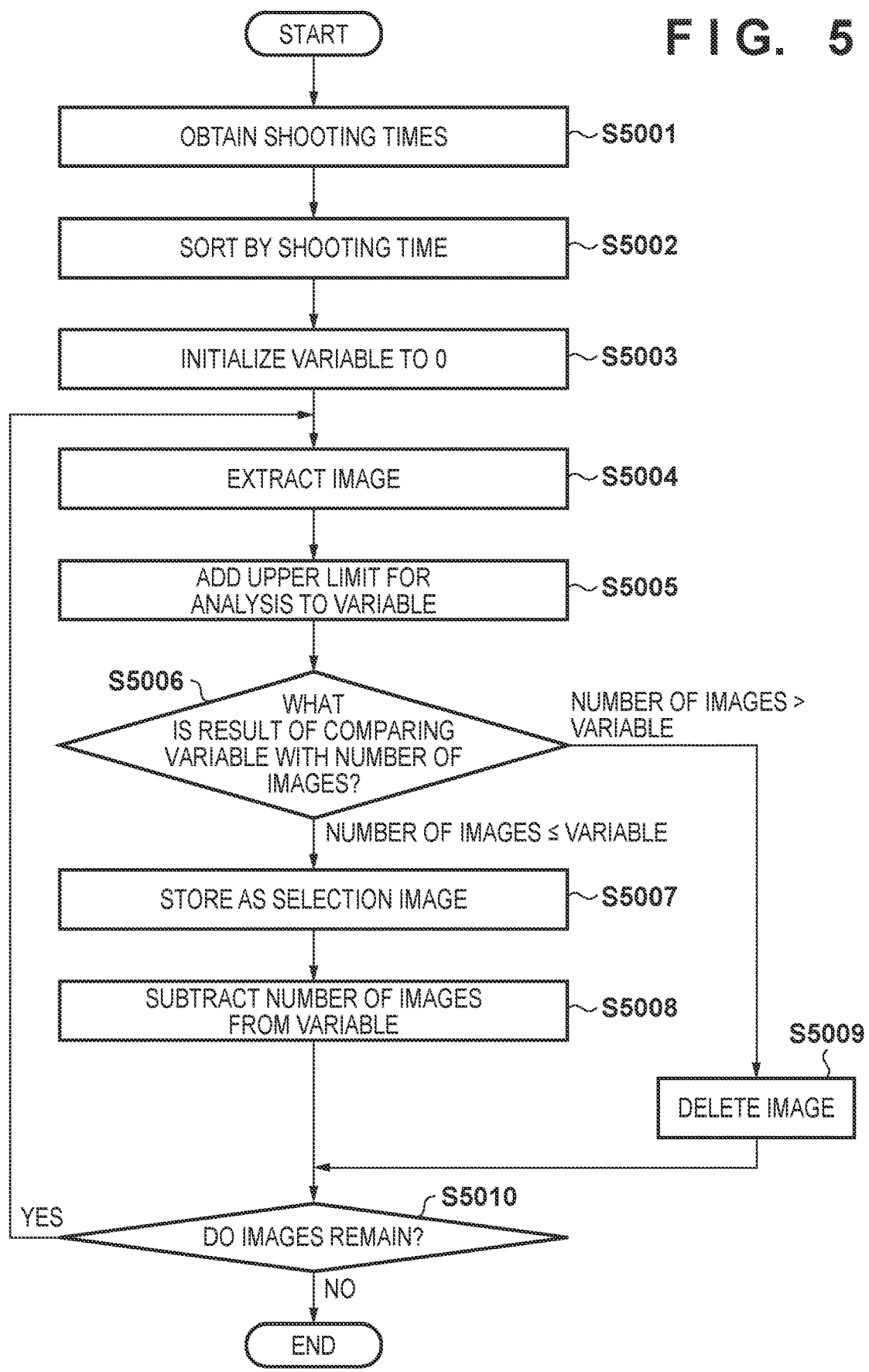
FIG. 5 is a flowchart illustrating selection processing according to a selection method 3.

Selection Method 3 (FIG. 5)

FIG. 5 is a flowchart showing the processing of the selection method 3. In the selection method 3, the image information is selected every predetermined number of images by using the image metadata. According to the selection method 3, for example, in the case where shooting time is used as the image metadata, the image array is sorted by shooting time, and selection is performed in fixed intervals in the order of the shooting time so that the final number of images is equal to or less than the upper limit for analysis. For example, in the case where there are 100 image candidates to be subjected to image analysis and the upper limit for analysis is 50, 100 images are sorted by shooting time as image metadata. Then, in the order of the sorted 100 images, 50 even-numbered images (2, 4, 6, . . . , 100) are selected every other two images. A detailed explanation is as follows.

In step S5001, the CPU 1011 obtains the shooting time as image metadata, and sets the shooting time in an image array allocated in the storage area of the RAM 1010. In step S5002, the CPU 1011 sorts the image arrays in ascending order using shooting time as a key. NI images are stored in the image array. For example, in the above example, the number of images 100 is set to NI.

Next, in step S5003, the CPU 1011 initializes the variable x to "0". The variable x is compared with the number of images NI, as will be described later in step S5006, and the variable x is used to determine whether or not the image of interest is to be the target of image analysis. In step S5004, one image is extracted from the head of the image array sorted by the shooting time. In step S5005, the upper limit for analysis (PUL) is added to the variable x (x←x+PUL). In the above examples, since the upper limit for analysis PUL is 50, when the step S5005 process is executed for the first time, the variable x is set to 0+50=50.

In step S5006, the CPU 1011 compares the variable x with the number of images. The number of images is the number of images (NI) obtained in step S5001 based on the image metadata (e.g., 100). Here, if the variable is equal to or more than the number of images (x≥NI), the process proceeds to step S5007, and if the variable is less than the number of images (x<NI), the process proceeds to step S5009. For example, in the above example, when the first image in the sorted order (e.g., the image having the oldest shooting time) was extracted in step S5004, x(=50)<NI(=100) is satisfied, so the process proceeds to step S5009.

In step S5009, the CPU 1011 discards the image extracted from the image array by step S5004, and excludes the image from subsequent image analysis. That is, it is also excluded from the layout execution target. As a result, the number of images stored in the image array is reduced by one. Then, in step S5010, the CPU 1011 determines whether or not an image remains in the image array. When it is determined that an image remains in the image array, the index is incremented and the process from step S5004 is repeated. On the other hand, when it is determined that no image remains in the image array, the process of FIG. 5 is terminated.

In the case of the above example, the process returns from step S5010 to step S5004, and the second image in the sorted order (e.g., the image with the second oldest shooting time) is extracted by step S5004. In such a case, PUL (50) is added to the current variable x (50) in step S5005. Therefore, in step S5006, x(=100)≥NI(=100), so that the process proceeds to step S5007.

In step S5007, the CPU 1011 stores the image obtained in step S5004 in a selection array allocated separately from the image array. As a result, the extracted image is moved from the image array to the selection array, so that the image is selected as a target of image analysis. Also, the number of images stored in the image array is reduced by one. In addition, in step S5008, the CPU 1011 subtracts the number of images from the variable(x) (x←x−NI). In the case where the second image is extracted in step S5004, since NI (100) is subtracted from the variable x (100) at that time, the variable x becomes 0. Then, the step S5010 process is executed.

When the process returns from step S5010 to step S5004 again, the third image is taken out in step S5004, and when the variable x becomes 50 in step S5005, it is determined that x(=50)<NI(=100) in step S5006. Therefore, in step S5009, the third image is excluded from the target of image analysis.

The above processing is repeated until "No" is determined in step S5010 (until the processing is performed on the 100th image in the above-described example).

Through the above processing, by selecting an image every predetermined number of images (every two images in the above example), the number of images of the image array can be selected to be equal to or less than the upper limit for analysis (PUL).

Note that in the above example, since there is a relationship such that the number of images (100) of the image analysis target candidates is divisible by the upper limit for analysis (PUL=50), an image is selected every predetermined number of images (every two images). Here, when there is a non-divisible relationship, the variable may be initialized to 0 instead of subtracting the number of images from the variable in step S5008. With such a configuration, for example, when the number of image analysis candidates is 100 and the upper limit for analysis is 30, images are selected every four images (4, 8, 12, 16, . . . ). As described above, the image analysis candidates are selected at intervals based on a relationship between the number of images and the upper limit for analysis.

Figure 6:
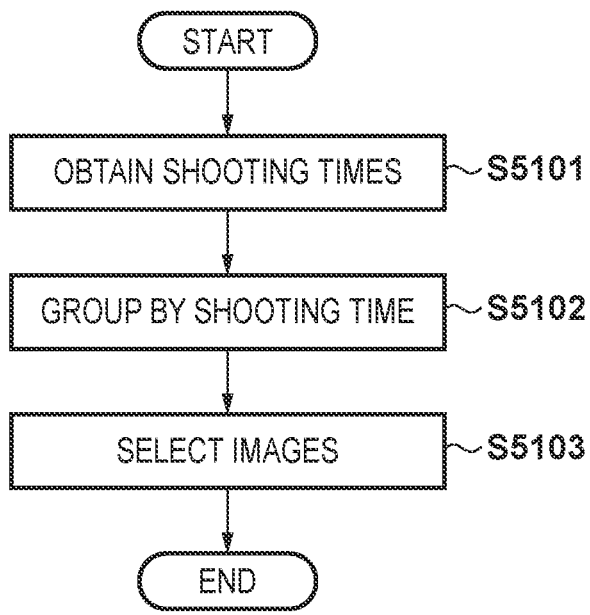
FIG. 6 is a flowchart illustrating selection processing according to a selection method 4.

Selection Method 4 (FIG. 6)

FIG. 6 is a flowchart showing the processing of the selection method 4. The selection method 4 is used, for example, when selecting images so that, when the number of photographs taken differs depending on the period or a specific time band, even photographs of a period in which the number of images is small do not fail to be selected. For example, the number of shots may be large for seasonal events, birthdays, and the like, and the number of shots may be small in everyday scenarios. In such a case, when the selection method 1, the selection method 2, and the selection method 3 described above are used, there is a possibility that a photograph of an everyday scenario will not be selected. Using the selection method 4, such a situation can be avoided.

In step S5101, the CPU 1011 obtains the shooting time as image metadata, and sets the shooting time in an image array allocated in the storage area of the RAM 1010. In step S5102, the CPU 1011 classifies the image array into a plurality of image arrays by grouping elements according to the following condition. For example, images are grouped for each specific period, such as an image group whose shooting period is January 2014 and an image group whose shooting period is February 2014. Then, (NI–PUL–1)/(the number of groups) images are deleted from each group.

That is, in step S5102, images corresponding to the number obtained by dividing the number of images to be deleted by the number of groups are deleted. In this manner, since the images are uniformly deleted from each group, it is possible to reduce the possibility that image data of a month in which the number of shots is small or the like is excluded from the analysis target. In step S5103, the CPU 1011 selects images of the respective groups. As the selection method, any one of the above-mentioned selection methods 1 to 3 may be used. Alternatively, a predetermined method may be used, or the user may be allowed to choose the selection method.

According to the above-described selection methods 1 to 4, the image array is selected to have a size equal to or smaller than the upper limit for analysis.

Figure 7:
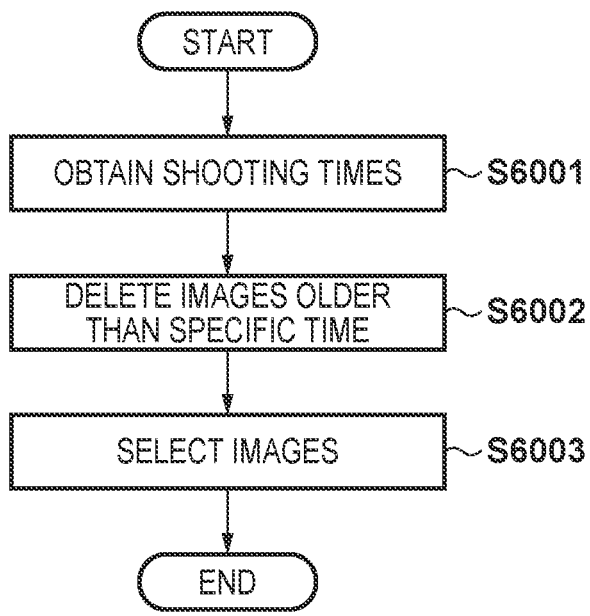
FIG. 7 is a flowchart illustrating selection processing according to a selection method 5.

Selection Method 5 (FIG. 7)

FIG. 7 is a flowchart showing the processing of the selection method 5. The selection method 5 is used, for example, when recreating an album that was created in the past. For example, when an album was created one year ago, it is often more in line with the user's needs to create the album with photographs taken from the creation of the album until the present time and not to include photographs used when the album was created one year ago. In such a case, the selection method 5 is used. The selection method 5 may be used, for example, when the setting of the shooting date/time period of the image is not accepted in the target period box 812.

In step S6001, the CPU 1011 obtains shooting times as image metadata, and sets the shooting times in an image array allocated in the storage area of the RAM 1010. In step S6002, the CPU 1011 deletes, from the image array, images that are older than a specific time/period into the past from the present date. Then, in step S6003, the CPU 1011 selects from the remaining images. Here, if the number of images included in the image array after the deletion is equal to or less than the upper limit for analysis (PUL), the process proceeds directly to the image analysis, and if the number of images exceeds the upper limit for analysis, selection is performed by using any one of the above-described selection methods 1 to 4. Since old images may also be stored in the storage apparatus 1008, an album may be generated from image data captured over a long period of time. Therefore, it is possible to create an album in which the old image data is omitted by limiting the period of the images to be the target of album creation in advance by using the selection method 5. Then, as described above, when the number of images selected does not become equal to or less than the upper limit for analysis (PUL) when images are selected by using the period only, the images are further selected by using any one of the selection methods 1 to 4 described above.

When the selection is executed by the methods of the above-described selection methods 1 to 5, when a characteristic character string, for example, a ★ mark, or a keyword such as "travel" or "party", or the like is included in the folder name of the folder in which the image data is stored, there is a high possibility that an image that is important to the user is stored therein. In such a case, a folder name including the characteristic character string may be excluded from the target of selection. For example, assume that the upper limit for analysis is 50, the number of images stored in a folder specified by the user in step S2002 is 100, and there is a folder in which a ★ mark is added to the folder name in which 15 images are stored in the hierarchy below that folder. In such a case, the 15 images in the folder marked with ★ may be set as analysis target images, and 35 (obtained by subtracting 15 as the number of images in the folder marked with ★ from 50 as the upper limit for analysis) images may be selected from the remaining 85 images in the specified folder.

Further, in the above description, the shooting date of the images is used as the image metadata in the image selection, but the selection may be performed using other metadata. For example, based on rating information set for the images, an image with a high rating that is larger than a threshold value may be made to be a target of analysis and excluded from the target of the selection, and images with a rating equal to or lower than the threshold value may made to be the target of selection.

Reference is again made to FIG. 2. After selection in step S2006, in step S2007, the CPU 1011 performs image analysis/scoring on the selected image data. At this time, the CPU 1011 reads image data from the folders specified by step S2002 into the RAM 1010, and performs image analysis thereon. In the image analysis, for example, feature amounts such as the number, position, and size of facial images are analyzed. Then, the data of each image is evaluated (scored) for how close it is to an image feature (e.g., whether there are many people therein or whether the image is a closeup) required for the template designated by the template designation icon 805.

Here, depending on the analysis result, there is a possibility that image data that does not satisfy a predetermined criterion for use in the layout (hereinafter, sometimes referred to as an error image) will be included. The predetermined criterion not being satisfied may mean, for example, that a part of the image data is damaged, and while header information such as the shooting date and time of the image can be correctly recognized, a reading error occurs when the actual image data is read. Also, for example, there are cases where the header information of the image data is recorded in the storage apparatus 1008 of the information processing apparatus 1004 or the ROM 1009 itself, but the image data itself is stored on a network storage connected on the network, and a network connection error occurs when the result of network communication for reading the image is that communication is impossible. In addition, for example, there are cases in which image data can be read correctly, but the image is found as the result of analysis to be a photographic failure such as when it is completely black, or is found to be a blurred photograph by frequency analysis, and so an analysis error occurs. In addition, there are cases where scoring is lower than a criterion for becoming a layout target, and so the image is not made to be a target of the layout.

If there are only a few error images as a result of the analysis/scoring of the images, the laying out can be performed after excluding the unusable images. However, when the number of error images is large, there is a possibility that the quality of the layout will deteriorate or that the number of images will be less than the number necessary for the layout. For example, if a photo album of 20 pages is created and photographs are arranged for each page, 20 or more photographs are required. However, when 100 images are selected and the number of error images exceeds 80, the number of images that satisfy the predetermined criterion and can be laid out is less than 20, and the layout fails.

In the present embodiment, by performing a re-selection when the layout fails as a result of the selection, it is possible to reduce the possibility that the layout will fail, without requiring a user operation.

In step S2008, the CPU 1011 obtains the number of images that can be used for the layout from the result of the analysis in step S2007, and determines whether the layout is possible from the obtained number of images. Specifically, it is determined whether the number of obtained images is less than a predetermined number or is greater than or equal to the predetermined number. For example, the minimum number (MIN) of images required for a layout may be set in advance, and when the number of images that can be used for layout is less than the minimum number (MIN), it may be determined that layout is not possible. In this case, the minimum number (MIN) may be, for example, the number of pages of the photo album. Further, for example, it may be determined that the layout is not possible when a number of images that is determined based on the number of images after selection and the minimum number of images is not reached. For example, the number of images by which it is determined that the layout is possible may be set between the minimum number of images and the number of images after selection. If it is determined in step S2008 that the layout is not possible, the process proceeds to step S2009, and if it is determined that the layout is possible, the process proceeds to step S2013.

In step S2009, the CPU 1011 excludes images determined to be impossible to use in the layout as a result of the analysis/scoring of the image in step S2007 (hereinafter, referred to as an error image) from the image list of the layout target generated in step S2003. When an error image exists, there is a possibility that images in the vicinity of the error image whose file name is consecutive to that of the error image will be internally damaged similarly to the error image. In such a case, the CPU 1011 may exclude, for example, images that are consecutive in the vicinity of the error image from the image list to be laid out. Further, for example, when image data whose shooting date/time is within a certain period is damaged, there is a possibility that other image data within the shooting date/time period will also be damaged internally. In this case, the error image and the nearby date/time image data may also be excluded from the layout target image list. After the error images are excluded from the image list to be laid out, the process returns to step S2005.

In the present embodiment, information of image data that, as the result of image analysis/scoring, is excluded from the target of the layout due to file corruption or the like is held in the storage apparatus 1008 or the ROM 1009 as an image list of layout non-targets. When executing the process of FIG. 2 at a later date, the CPU 1011 may exclude image data held in the image list of layout non-targets from the layout target (e.g., exclude from the target of creation of the image list in step S2003).

The second and subsequent execution of the step S2005 process will be described. In step S2005, the CPU 1011 again determines the selection method. For example, the CPU 1011 determines the selection method to be the same as the selection method determined in the first execution of step S2005. When executing step S2005 the second and subsequent times, step S2009 excludes error images from the image list generated in step S2003. That is, error images are not a candidate for the second image selection. On the other hand, an image that was not selected in the first execution of the step S2006 process again becomes a candidate of selection in the second image selection if it has not been excluded from the image list in step S2009. Therefore, even if the step S2005 process itself is the same, the results selected in step S2005 differ. However, in the case described below, when the same selection method is determined in step S2005, it is highly likely that it will be determined again that the layout is not possible in step S2008. Therefore, as described below, according to the features of the image array of the image list, a selection method of the second and subsequent executions that is different from the selection method of the first time in step S2005 is determined.

For example, assume that 700 similar images captured in a short time by a continuous shooting function of a camera or the like are included in the image list of 1000 images obtained in step S2003, and most of the 700 images are error images. When 100 images (=PUL) are selected from the 1000 images, if the images are randomly selected by the selection method 1 in the first execution and the images are analyzed, it is highly likely that many images of the time of the continuous shooting will be included and it will be determined that the layout is not possible in step S2008. After that, when the error images are excluded in step S2009 and images are randomly selected again by the selection method 1 in step S2005 and then the images are analyzed, since many error images will remain in the image list, it may be determined again that the layout is not possible in step S2008. Therefore, in such cases, if the selection method is changed from the selection method 1 to the selection method 2, and images are selected after being sorted by the shooting time difference with respect to an adjacent image, and then the images are analyzed, the possibility of determining that the layout is not possible in step S2008 becomes lower.

In the above case, when it is determined that the layout is impossible in the first execution of step S2008, the CPU 1011 changes the selection method in step S2005. By changing the selection method in the second execution, it is possible to reduce the possibility that it is determined that the layout is not possible in the determination again, and it is possible to shorten the time until it is determined that the layout is possible.

The second and subsequent changes of the selection method may be determined in a predetermined order, such as cyclically determining the selection methods 1 to 5. When the selection method is changed in the second and subsequent executions, the selection method may be changed in accordance with information based on a feature of the array of metadata, for example, in accordance with there being a large number of images having a short shooting time difference, as in the case described above. Further, for example, when the user selects the selection method via a UI, a dialog that can accept an instruction as to whether or not to change the selection method in the second or subsequent execution may be displayed to the user. When the selection method is determined again in step S2005, step S2006 and subsequent processes are performed again.

In the above description, the selection method is changed in step S2005 in the second and subsequent execution. Here, step S2005 may further change the upper limit for analysis. For example, assume that an image list composed of 1000 images is obtained in step S2003, 100 images (high-speed analysis mode) are selected in step S2006, and it is determined that the layout is not possible in step S2008. Here, for example, in a case where half or more of the selected 100 images are error images, even if these error images are deleted from the image list in step S2009, there is a high possibility that many error images will remain in the image list. Therefore, even if 100 images are selected from the image list and image analysis is performed again, there is a high possibility that it will be determined that the layout is not possible again, and therefore, the possibility that it is determined that the layout is not possible will become lower if a larger number of images are selected and analyzed. Therefore, when it is determined in step S2008 in the first execution that the layout is impossible, the CPU 1011 changes the upper limit for analysis in step S2005.

For example, if the first execution is in the high-speed analysis mode, the second time is changed to the normal analysis mode in accordance with the number of error images deleted from the image list in the first execution. Further, for example, configuration may be such that the upper limit for analysis of the first execution is changed to an upper limit for analysis that is increased by a predetermined ratio. In addition, for example, in step S2005, a dialogue may be displayed in which the user can accept an instruction as to whether or not to change the upper limit for analysis for the second or subsequent execution.

In the above explanation, as a result of performing the analysis/scoring in step S2007 in the first execution, the image data that can be used for the layout is also assumed to be made to be the target of the selection again. However, configuration may be taken such that the image data that can be used for the layout is confirmed as image data that can be used for the layout and excluded from the target of the reselection, and the selection is performed again on the remaining images in image list.

In the processing of steps S2005 to S2009 of FIG. 2, when the number of images that can be used in the layout is smaller than the minimum number of images by which the layout can be performed, an error may be notified and the processing of FIG. 2 may be stopped. With such a configuration, it is possible to prevent the processing from step S2005 to S2009 from looping infinitely.

When it is determined in step S2004 that the number of images in the image list is equal to or less than the upper limit for analysis, in step S2010, the CPU 1011 performs image analysis/scoring on the image data. In step S2011, the CPU 1011 obtains the number of images to be laid out from the analysis result in step S2010, and determines whether the layout is possible. If it is determined that the layout is possible, the process proceeds to step S2013. On the other hand, when it is determined that the layout is not possible, in step S2012, the CPU 1011 displays an error to the effect that the layout is not possible to the user, and ends the process of FIG. 2.

In step S2013, the CPU 1011 performs the layout in relation to an album template preferentially using image data having a higher score based on the result of scoring in step S2007 or step S2010. After step S2013, the processing of FIG. 2 ends, and the processing of step S8004 of FIG. 8A is executed.

As described above, according to the present embodiment, even if data of images of a number exceeding the upper limit for analysis is included in, for example, a folder that is an obtainment destination of image data to be laid out, album creation can be executed by selecting the data of images of a number that is equal to or less than the upper limit for analysis based on the image metadata. Further, when, as the result of analyzing the images after the images are selected according to a certain selection condition, the number of images satisfying a predetermined criterion as a layout target is less than a predetermined number, the selection condition is changed and the selection is performed again. Therefore, even if a layout cannot be executed as a result of excluding images that do not satisfy the predetermined criterion, appropriate images may be selected in a re-selection in some cases. As a change of the selection condition, since images that do not satisfy the predetermined criterion are excluded from the plurality of selection candidate images and re-selection is performed for example, the probability of failure due to not enough usable image data being obtained for the layout can be reduced. Also, in the re-selection, by changing the selection method and performing the selection again, it is possible to further shorten the time until it is determined that the layout is possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125288, filed Jun. 29, 2018 which is hereby incorporated by reference herein in its entirety.

What is claimed is:

1. An information processing method for outputting album data corresponding to an album in which images are laid out, the method comprising:
obtaining information corresponding to each of a plurality of images;
selecting a plurality of analysis target images from the plurality of images based on the obtained information;
executing a predetermined analysis on the plurality of selected analysis target images; and
in a case where, a number of images that are selected in the selection and that satisfy a predetermined criterion as a result of the executed predetermined analysis is a predetermined number or greater of images, outputting album data corresponding to an album in which images included in the predetermined number or greater of images are laid out,
wherein in a case where images satisfying the predetermined criterion among the plurality of analysis target images are selected in the selection in accordance with a predetermined selection condition and the number of the selected images is less than the predetermined number, the predetermined analysis is executed on a predetermined image not selected by the predetermined selection condition, and album data corresponding to an album in which the predetermined number or greater of images including the predetermined image are laid out is output based on the result of the predetermined analysis in the outputting.

2. The information processing method according to claim 1, wherein, when the number of images satisfying the predetermined criterion among the plurality of analysis target images selected in accordance with a first selection condition as the predetermined selection condition is less than the predetermined number, a re-selection is executed, in the selection, in accordance with a second selection condition, and the predetermined image selected by the re-selection and not selected by the first selection condition is analyzed.

3. The information processing method according to claim 2, wherein the second selection condition is a condition by which selection, from a plurality of selection candidates from which images, among the plurality of images, selected by the first selection condition and not satisfying the predetermined criterion were excluded, is performed, and
wherein the outputting outputs album data corresponding to an album in which images included in the predetermined number or greater of images are laid out in a case where the number of images selected by the second selection condition and satisfying the predetermined criterion is the predetermined number or greater.

4. The information processing method according to claim 2, wherein the second selection condition is a condition by which selection, from a plurality of selection candidates, among the plurality of images, in which first images selected by the first selection condition and not satisfying the predetermined criterion and second images selected by the first selection condition and satisfying the predetermined criterion are excluded, is performed, and
wherein the outputting outputs album data corresponding to an album in which images included in the predetermined number or greater of images are laid out in a case where the number of images combined in the second image and the images selected by the second selection condition and satisfying the predetermined criterion is the predetermined number or greater.

5. The information processing method according to claim 1, wherein the predetermined analysis is executed on the predetermined image, and when the result of the predetermined analysis satisfies the predetermined criterion, album data corresponding to an album in which the predetermined image is laid out is output.

6. The information processing method according to claim 1, further comprising, in a case where a number of images that are selected in the selection and that satisfy a predetermined criterion as a result of the executed predetermined analysis is a predetermined number or greater of images, laying out images included in the predetermined number or greater of images,
wherein the outputting outputs album data corresponding to an album in which the laid out images are laid out.

7. The information processing method according to claim 6, wherein the layout lays out images included in the predetermined number or greater of images based on the predetermined analysis result for each of the predetermined number or greater of images, in a case where the number of images for which the predetermined analysis result satisfies the predetermined criterion is the predetermined number or more.

8. The information processing method according to claim 7, wherein, based on an evaluation value based on the predetermined analysis result for each of the predetermined number or greater of images, the layout preferentially lays out an image, included in the predetermined number or greater of images, having a higher evaluation value.

9. The information processing method according to claim 1, wherein the outputting outputs the album data to a printer as print data.

10. The information processing method according to claim 1, wherein the outputting transmits the album data to an external server.

11. The information processing method according to claim 10, wherein the album is bound by printing based on the transmission of the album data to the external server in the outputting.

12. The information processing method according to claim 1, wherein the obtained information includes an image shooting time.

13. The information processing method according to claim 1, wherein an image that does not satisfy the predetermined criterion includes corrupted image data.

14. The information processing method according to claim 1, wherein an image that does not satisfy the predetermined criterion includes an image from which image data could not be obtained for the executed predetermined analysis.

15. The information processing method according to claim 1, wherein the selecting selects the plurality of analysis target images on a condition that the number of images of the plurality of images is greater than a second predetermined number which is larger than the predetermined number, and
wherein in a case where the number of images of the plurality of images is less than the second predetermined number, the predetermined analysis is executed on each of the plurality of images by executing the analysis.

16. The information processing method according to claim 1, further comprising:

notifying a warning that a layout is not possible based on the number of images satisfying the predetermined criterion.

17. An information processing apparatus operable to output album data corresponding to an album in which images are laid out, the apparatus comprising:
at least one processor causing the information processing apparatus to act as:
(1) an obtaining unit configured to obtain information corresponding to each of a plurality of images;
(3) a selection unit configured to, based on the information obtained by the obtaining unit, select, from the plurality of images, a plurality of analysis target images;
(4) an analysis unit configured to execute a predetermined analysis on the plurality of analysis target images selected by the selection unit; and
(5) an output unit configured to, in a case where, a number of images that are selected by the selection unit and that satisfy a predetermined criterion as a result of the predetermined analysis executed by the analysis unit is a predetermined number or greater, output an album in which images included in the predetermined number or greater of images are laid out,
wherein in a case where images satisfying the predetermined criterion among the plurality of analysis target images are selected by the selection unit in accordance with a predetermined selection condition and the number of the selected images is less than the predetermined number, the predetermined analysis is executed by the analysis unit on a predetermined image not selected by the predetermined selection condition, and album data corresponding to an album in which the predetermined number or greater of images including the predetermined image are laid out based on the result of the predetermined analysis by the output unit.

18. A non-transitory computer-readable storage medium storing a program which, when executed by a computer comprising a processor and a memory, causes the computer to:
obtain information corresponding to each of a plurality of images;
select a plurality of analysis target images from the plurality of images, based on the obtained information;
execute a predetermined analysis on the plurality of selected analysis target images; and
in a case where, a number of images that are selected in the selection and that satisfy a predetermined criterion as a result of the executed predetermined analysis is a predetermined number or greater of images, output album data corresponding to an album in which images included in the predetermined number or greater of images are laid out,
wherein in a case where images satisfying the predetermined criterion among the plurality of analysis target images are selected in the selection in accordance with a predetermined selection condition and the number of the selected images is less than the predetermined number, the predetermined analysis is executed on a predetermined image not selected by the predetermined selection condition, and album data corresponding to an album in which the predetermined number or greater of images including the predetermined image are laid out is output based on the result of the predetermined analysis in the outputting.

* * * * *